No. 709,857. Patented Sept. 30, 1902.
W. G. ANDERSON.
SAW.
(Application filed Feb. 17, 1902.)
(No Model.)
Fig. 1.
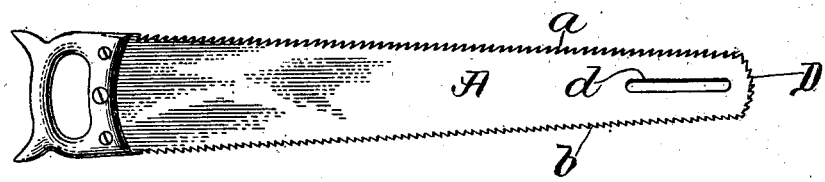
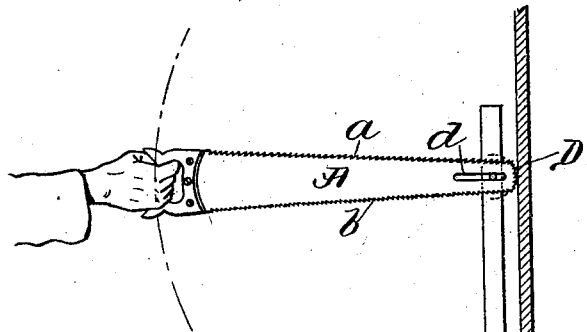
Fig. 2.
Witnesses:
Joseph T. Brennan.
E. D. Chadwick.
Inventor:
William G. Anderson,
by Oliver R. Mitchell,
Attorney.

United States Patent Office.

WILLIAM G. ANDERSON, OF BOSTON, MASSACHUSETTS, ASSIGNOR OF ONE-HALF TO PRESCOTT BIGELOW, OF BOSTON, MASSACHUSETTS.

SAW.

SPECIFICATION forming part of Letters Patent No. 709,857, dated September 30, 1902.

Application filed February 17, 1902. Serial No. 94,350. (No model.)

*To all whom it may concern:*

Be it known that I, WILLIAM G. ANDERSON, of Boston, in the county of Suffolk and State of Massachusetts, have invented a new and useful Saw, of which the following is a specification, reference being had to the accompanying drawings, in which—

Figure 1 is a side elevation of my new saw. Fig. 2 shows the saw in operation.

In the drawings, A represents the blade of my improved saw, one edge $a$ of which is preferably formed with ripping-teeth, and the other edge $b$ is preferably formed with crosscut teeth. Across the extreme end D of the saw, which end is formed approximately at right angles to the longitudinal axis of the saw, extends a line of teeth preferably fine as compared with the teeth formed upon the other edges of the saw and preferably also tempered for cutting metal should it be necessary. This end D preferably curves slightly to where it meets the line of teeth on the sides of the saw, so as to obviate a sharp angle between the end D and the two sides $a$ $b$. An aperture $d$ is formed along the medial line of the saw for a purpose hereinafter to be mentioned.

One main object of my new saw is to enable a mechanic to have in one tool means for making an opening through any desired material, through which opening the saw itself can then be passed to be used in the regular manner. Heretofore it has been necessary to form this preliminary slot by boring a hole and from this hole by means of a keyhole-saw start a slot wide enough to receive the blade of the saw. By the use of my new saw, however, the use of the bit and keyhole-saw is rendered unnecessary.

The mode of operation of my new saw is as follows: Let us suppose that it is desired to remove a panel from a door. By the old method it would have been necessary to bore a hole through the panel at the point of commencement and from this hole to have started a slot in the wood by means of a keyhole-saw sufficiently long to receive the blade of the ordinary saw. When my saw is used, it is simply necessary to erect close beside the door a scantling or something of that nature and to pivot my new saw upon this scantling by passing a screw through the aperture $d$, so that the end D of the saw is presented close to the surface of the panel. By working the handle of the saw up and down and at the same time pressing the saw forward the end D of the saw is vibrated around the pivot in the aperture $d$ as a center, and as it is pressed forward the saw enters the wood and cuts the desired opening. When the end of the saw has in this way been forced through the door, the pivot-screw is removed from the aperture $d$, the scantling removed, and the saw used in the ordinary way. My saw is also extremely useful in other situations than the one I have described, for its capacity to utilize its end as a sawing edge and the pivotal aperture which enables it to be pivoted near its sawing end while the handle is moved up and down in a direction at right angles to that in which it is ordinarily moved to accomplish the sawing enables results to be attained and in places which otherwise could not be operated upon or attained.

I claim—

1. A handsaw having a cutting edge across its end opposite the handle.

2. A handsaw having a cutting edge across its end opposite the handle and substantially at right angles to the longitudinal axis of the saw.

3. A handsaw having a cutting edge across its end opposite the handle and provided with an aperture adjacent said end, for receiving a pivot.

4. A handsaw having cutting edges upon two sides and across the end opposite the handle and provided with an aperture adjacent said end for receiving a pivot.

WILLIAM G. ANDERSON.

Witnesses:
CHARLES S. THURSTON,
JOSEPH T. BRENNAN.